United States Patent [19]

Ebel et al.

[11] Patent Number: 4,888,412

[45] Date of Patent: Dec. 19, 1989

[54] TANNING ASSISTANT

[75] Inventors: Klaus Ebel, Mutterstadt; Wolfgang Reuther, Heidelberg; Rolf Fikentscher, Ludwigshafen; Dietrich Lach, Friedelsheim; Rolf Streicher, Worms; Ortwin Schaffer, Ludwigshafen, all of Fed. Rep. of Germany

[73] Assignee: BASF Aktiengesellschaft, Ludwigshafen, Fed. Rep. of Germany

[21] Appl. No.: 225,366

[22] Filed: Jul. 28, 1988

[30] Foreign Application Priority Data

Jul. 28, 1987 [DE] Fed. Rep. of Germany ....... 3724868

[51] Int. Cl.$^4$ .............................................. C08G 12/10
[52] U.S. Cl. ................................... 528/230; 528/239; 528/242; 528/245; 528/248; 528/254; 528/256; 528/257; 528/260; 528/265
[58] Field of Search ............. 8/94.19 R, 94.29, 94.33; 528/230, 239, 242, 245, 248, 254, 256, 257, 260, 265

[56] References Cited

U.S. PATENT DOCUMENTS

| 2,574,114 | 11/1951 | Lehmann et al. | 8/183 |
| 4,001,337 | 1/1977 | Diem et al. | 568/422 |
| 4,455,416 | 6/1984 | Floyd et al. | 528/245 |
| 4,505,712 | 3/1985 | Floyd et al. | 8/186 |
| 4,625,029 | 11/1986 | Floyd et al. | 544/309 |

OTHER PUBLICATIONS

J. Amer. Leather Chem. Assoc. 76(1981), pp. 231–244, Mimosa-Al Tannages—an Alternative to Chrome Tanning, Neville P. Slabbert Leather Industries Research Institute S.A.

*Primary Examiner*—John Kight
*Assistant Examiner*—S. A. Acquah
*Attorney, Agent, or Firm*—Oblon, Spivak, McClelland, Maier & Neustadt

[57] ABSTRACT

A tanning assistant useful in particular for tanning in combination with aluminum tanning agents is obtained by condensing melamine with glyoxal and/or glyoxylic acid and optionally with an aromatic compound which has a phenolic hydroxyl group or optionally with a condensable nitrogen compound.

4 Claims, No Drawings

TANNING ASSISTANT

The present invention relates to a tanning assistant obtained by condensing melamine with glyoxal and/or glyoxylic acid and optionally also with an aromatic compound having a phenolic hydroxyl group and also optionally with a condensable nitrogen compound, to the preparation and use thereof, and to a process for tanning with this condensation product, in particular combined with aluminum based tanning agents.

Chrome tanning is one of the most important methods of tanning. However, there is increasing interest in chromium-free mineral tanning because, for example, of the problem of disposing of chromium-containing effluent. Obvious alternatives to chromium compounds are for example aluminum, titanium or zirconium compounds in the form of their salts. However, the leather obtained, in particular if aluminum compounds are used alone, has an insufficiently high shrinkage temperature. In general, the shrinkage temperature should be above 90° C., ideally around 100° C. Furthermore, it is usually a disadvantage that aluminum-based tanning agents are relatively easy to wash off, i.e. that the leather has only a limited water resistance.

J. Amer. Leather Chem. Assoc. 76 (1981), 230–244, describes the combination of mimosa extract with aluminum compounds as an alternative to chrome tanning. The disadvantage with this tanning method is the browning of the leather due to the mimosa extract and the inadequate light fastness of the tanned leather.

The condensation of melamine with various aldehydes has long been known, for example in the form of the reaction of melamine with glyoxal and then formaldehyde to give a textile assistant as described in U.S. Pat. No. 2,574,114. Condensates of melamine with glyoxylic acid and glyoxal, optionally with a compound having phenolic hydroxyl groups and optionally with amides, imides or amines have hitherto not been described before.

It is an object of the present invention to provide a tanning agent or assistant for a chromium-free tanning process avoiding the disadvantages of poor light fastness properties and the browning of a mimosa/aluminum tanning.

We have found that this object is achieved in a process for tanning leather with a tanning assistant based on a condensation product of melamine with glyoxal and/or glyoxylic acid, optionally with an aromatic compound having one or more phenolic hydroxyl groups and optionally with a condensable compound having a reactive nitrogen-containing group and the preparation and use of this tanning assistant together with a chromium-free mineral tanning agent.

The present invention accordingly provides a process for tanning leather in an aqueous liquor by treating a pickled pelt with a condensation product of melamine and glyoxal and/or glyoxylic acid, if desired in the form of an alkali metal salt, and optionally with an aromatic compound having one or more phenolic hydroxyl groups selected from a group consisting of phenolsulfonic acid, sulfosalicylic acid, salicylic acid and 8-hydroxyquinoline, or optionally with a condensable compound having a reactive nitrogen-containing group, in an amount of from 4 to 20% by weight, based on the pelt weight, at from 20 to 50° C. and then with an aluminum, zirconium or titanium compound as mineral tanning agent in an amount of from 4 to 16% by weight, based on the pelt weight, at from 20 to 45° C., the first and second stage being interchangeable.

The process according to the invention leads to a leather having high shrinkage temperatures of from 90 to 98° C. The color of the leather is ivory or white, as against the known brown of a mimosa/aluminum tanning, and the leather has a very good light fastness. A further advantage is that the light self-color remains unchanged even on prolonged storage at relatively high temperatures of, for example, from 60 to 80° C.

In what follows, aspects of the invention will be described in detail:

The starting material is usually a pickled pelt, for example a cattle pelt of from 1.5 to 4 mm in split thickness.

The aqueous liquor of the pickling bath is advantageously employed in liquor lengths of from 30 to 200%, preferably from 50 to 100%.

The condensation product used in the process according to the invention is obtained by condensing 1 mole of melamine with from 1 to 8 moles, preferably with from 2 to 6 moles, of glyoxylic acid, if desired in the form of an alkali metal salt, and/or with from 1 to 8 moles, preferably with from 2 to 6 moles, of glyoxal, the total . number of moles of glyoxylic acid and glyoxal being from 4 to 9, preferably from 5 to 7, in aqueous solution at from 20 to 100° C., preferably at from 40 to 90° C.

The condensation of melamine with glyoxal gives on simply heating, preferably at from 40 to 80° C., clear liquid resin solutions, if more than 5 moles, in particular from 5.1 to 8 moles, of glyoxal are used per mole of melamine.

If the amount of glyoxal is smaller, specifically if the amount of glyoxal is less than 5 moles per mole of melamine, in particular from 1 to 5 moles, the resin solutions turn solid within a short time. In this case it is possible to prepare soluble resin solutions if the condensation is carried out in the presence of from 0.1 to 2.0 equivalents of a strong or medium protonic acid per mole of melamine. Convenient protonic acids are for example hydrochloric acid, sulfuric acid, phosphoric acid, toluenesulfonic acid, formic acid, acetic acid and the like.

The condensation of melamine with glyoxylic acid is carried out with glyoxylic acid or an alkali metal salt thereof, in particular the sodium salt, by heating, preferably at from 50° to 90° C. It is also possible to use mixtures of glyoxylic acid and an alkali metal salt thereof.

The results obtained are always clear, water dilutable solutions.

Particularly preferred condensation products are obtained by condensing 1 mole of melamine with from 1 to 5 moles, preferably with from 2 to 4 moles, of glyoxylic acid or an alkali metal salt thereof and with from 1 to 5 moles, preferably with from 2 to 4 moles, of glyoxal, the total number of moles of glyoxylic acid or an alkali metal salt thereof and glyoxal being from 5 to 7, preferably from 5.5 to 6.5, in aqueous solution at from 20 to 100° C., preferably at from 40° to 80° C., by first converting the total amount of glyoxylic acid or alkali metal salt thereof and then converting the glyoxal under the same conditions.

Here too it is possible to use mixtures of glyoxylic acid and an alkali metal salt thereof.

This process always produces clear, water-dilutable solutions of melamine/glyoxylic acid/glyoxal resins.

As can be seen in the Examples, a precise structure can be assigned to the condensation product of 1 mole of melamine, 3 moles of glyoxylic acid or sodium glyoxylate and 3 moles of glyoxal. Further preferred compounds are the condensation products of molar ratio 1:2:4 and 1:4:2.

The condensation products of melamine, glyoxylic acid and glyoxal have not been described before. These condensation products therefore also form part of the subject-matter of the application.

In the condensation reactions described above, in general from 10 to 80% strength by weight, preferably from 30 to 60% strength by weight, aqueous solutions of the starting materials are reacted with stirring. The solutions obtained, which have advantageously been adjusted to solids contents of from 10 to 80% by weight, preferably of from 30 to 60% by weight, can be put directly to practical use. The condensation reactions, if performed within the specified temperature ranges, are usually complete within from 10 to 60 minutes.

The condensation products may be obtained in powder form in a conventional manner, such as removal of the water by distillation or for example by spray drying.

In a further refinement of the process according to the invention, the abovementioned melamine/glyoxal and the melamine/glyoxylic acid/glyoxal condensates may be modified by incorporation of a further condensable compound as cocondensed units by reacting from 0.1 to 3.0 moles, based on 1 mole of melamine, of a condensable compound directly in the preparation in a mixture with melamine or with a fully condensed solution under the abovementioned conditions in the absence or presence of an acid catalyst, for example one of the abovementioned protonic acids.

Advantageously, the molar amount of the additionally cocondensed compound does not exceed the molar amount of the aldehyde groups present.

Preferred cocondensable compounds having a phenolic hydroxyl group are phenolsulfonic acid, sulfosalicylic acid, salicylic acid and 8-hydroxyquinoline, the phenolsulfonic and sulfosalicylic acids being usable in the form of the technical-grade mixtures in which they are produced. The course and the end of the reaction with the phenolic compounds can be monitored in a simple manner through thin layer chromatography.

Examples of compounds having a condensable reactive nitrogen-containing group are carboxamides, sulfonamides, imides, ureas, amino and imino acids and also dialkylamines and dialkanolamines. Specific examples thereof are:

acetamide, benzamide, formamide, sulfamic acid, succinimide, glycine, iminodiacetic acid, phenylglycine, urea, dicyandiamide, diethanolamine and diethylamine. The acid compounds may be cocondensed in the form of their alkali metal salts.

Of the above, acetamide is particularly preferred.

The condensation products to be used according to the invention are added to the pickling bath in a conventional manner. In the tanning process of the invention, the pH in the first stage is advantageously maintained at from 2 to 5, preferably at from 2.5 to 4.0. The pH can be set by adding for example sodium bicarbonate.

In general, the condensation product is added in two portions, and drumming is performed for a total of from 1 to 18 hours.

In the second stage, the mineral tanning agents used are in particular commercial aluminum sulfate and commercial basic aluminum chloride, having for example a basicity of about 65% and an aluminum oxide content of from 22 to 23% or a basicity of about 20% and an aluminum oxide content of from 16 to 18%.

These mineral tanning agents are advantageously added in an amount of from 4 to 16%, preferably from 6 to 12%, based on the pelt weight.

The drumming is carried out at from 20° to 45° C., preferably at from 30° to 40° C., for from 1 to 18 hours, preferably for from 4 to 14 hours.

The drumming with mineral tannin agents is best carried out at a pH of from 2.0 to 4, preferably at a pH of from 3.0 to 4.0. Once the mineral tanning agent has been incorporated, the pH is adjusted to from 4.5 to 6, preferably from 4.5 to 5.5, in general by adding sodium formate, sodium acetate, sodium bicarbonate or magnesium oxide.

If zirconium salts are used, the pH is generally set at not higher than 2.5.

As mentioned above, the two tanning stages can be carried out in either order.

The invention is further illustrated by the Examples below. Parts and percentages are by weight.

USE EXAMPLES

USE EXAMPLE 1

100 parts of cattle pelt (2.0 mm in split thickness) are treated for 60 minutes in a pickling bath composed of 60 parts of water, 6 parts of sodium chloride, 0.6 part of formic acid and 0.6 part of sulfuric acid. At room temperature a solution of 25 parts of the 40% strength condensation product of Preparation Example 9, diluted at pH 4 with 75 parts water, is added to the pickling bath in two portions at a 90-minute interval, and drumming is continued for a further 90 minutes. 10 parts of a commercial aluminum chloride tanning agent (basicity 20%; $Al_2O_3$ content 16–18%) are then added to the liquor and mixed in overnight. The next morning the liquor pH is 2.9–3.2 parts of sodium acetate are added, and the leather is drummed for a further 60 minutes. The temperature is then raised to 40° C., and the liquor is brought to pH 5.6 in the course of 6 hours by adding a total of 1.8 parts of magnesium oxide a little at a time. The leather is stored overnight. It is then fatliquored in 100 parts of fresh liquor, neutralized and finished. The leather has a shrinkage temperature of 94° C., and is white and very soft. It is notable for excellent light fastness and heat resistance.

USE EXAMPLE 2

To 100 parts of pickled cattle pelt in 60 parts of pickling liquor as described in Use Example 1 are added 10 parts of a commercial aluminum chloride tanning agent (basicity 20%: $Al_2O_3$ content 16–18%) and drummed in at room temperature (25° C.) for 4 hours. Two portions of a solution of 25 parts of a 40% strength condensation product of Preparation Example 9, diluted at pH 4 with 75 parts of water, are then added at an interval of 90 minutes and mixed in overnight. The next morning the liquor pH is 3. The liquor is brought to pH 3.3 with 2 parts of sodium acetate and drummed in for 60 minutes. The liquor is then brought to pH 5.8 with 1.8 parts of magnesium oxide in the course of 6 hours, at 40° C. The leather is finished in a conventional manner. After fatliquoring it has a shrinkage temperature of 90° C., is soft and white and shows good resistance to light and heat.

USE EXAMPLE 3

Replacing the condensation product mentioned in Preparation Example 1 by equal parts of the condensation product of Preparation Example 12 gives similarly white and soft leather having a slightly lower shrinkage temperature of 92° C. Here too the leather is notable for good light fastness and heat resistance.

USE EXAMPLE 4

Using in place of the 1.8 parts of magnesium oxide mentioned in Use Example 1 only 1.1 parts gives a final pH of 4.2. The leather has a shrinkage temperature of 94° C., is soft and white and shows very good light fastness and heat resistance.

USE EXAMPLE 5

100 parts of pickled cattle pelt as per Use Example 1 are introduced into 60 parts of a pickling liquor in a drum. Two portions of a solution of 20 parts of the condensation product of Preparation Example 9, diluted at pH 4 with 75 parts water, are then added at a 90-minute interval, followed by 90 minutes of drumming each time. 6 parts of the aluminum tanning agent mentioned in Use Example 1 are then added and mixed in overnight. The next morning the liquor pH is 3.1. 2 parts of sodium acetate are added, and 60 minutes later the pH is 3.5. At 40° C. 1.1 parts of magnesium oxide and 0.4 part of sodium bicarbonate are added in the course of a total of 6 hours. The final liquor pH is 5.4. The leather is finished in a conventional manner. Following fatliquoring it has a shrinkage temperature of 90° C., is soft and white and shows good resistance to light and heat.

USE EXAMPLE 6

The aluminum tanning agent mentioned in Use Example 1 is replaced by 8 parts of another commercial aluminum tanning agent (basicity 65%; $Al_2O_3$ content 2223%). The leather treated therewith and fatliquored has a shrinkage temperature of 94° C., is white and soft and shows good light fastness and heat resistance.

USE EXAMPLE 7

The condensation product of Preparation Example 9 mentioned in Use Example 1 is replaced by equal parts of the condensation product of Preparation Example 23, affording a leather which, after fatliquoring, has a shrinkage temperature of 92° C. and is notable for good light fastness and heat resistance.

USE EXAMPLE 8

Repeating Use Example 1 using instead of the 1.8 parts of magnesium oxide 6 parts of sodium bicarbonate in the same period and working at room temperature (25° C.) gives a final pH of 5.5. After fatliquoring, the leather has a shrinkage temperature of 92° C. and shows good resistance to light and heat.

REPARATION EXAMPLES

EXAMPLE 1

A mixture of 193.0 g of 40% strength aqueous glyoxal solution (1.33 mol) and 21.0 g of melamine (0.17 mol) is heated at 40° C. for 15 minutes, and a clear solution forms. The solution is then cooled down and adjusted with 31.5 g of water to a solids content of 40% (calculated).

EXAMPLES 2–5

The procedure of Example 1 is followed to prepare products having different melamine:glyoxal molar ratios:

| Example | Melamine (g) | (mol) | Glyoxal 40% strength (g) | (mol) | Water (g) | Product |
|---|---|---|---|---|---|---|
| 2 | 25.2 | 0.20 | 203.0 | 1.40 | 37.8 | clear resin solution |
| 3 | 31.5 | 0.25 | 217.5 | 1.50 | 47.0 | clear resin solution |
| 4 | 35.0 | 0.28 | 222.0 | 1.53 | 52.5 | clear resin solution |
| 5 | 41.0 | 0.33 | 242.0 | 1.67 | 63.0 | initially a clear solution which, however, solidifies within a short time into a colorless solid |

EXAMPLE 6

A mixture of 49.7 g of melamine (0.39 mol) and 350.3 g of 50% strength aqueous glyoxylic acid solution (2.37 mol) is heated at 70° C. for 30 minutes, and a clear resin solution forms.

EXAMPLE 7

A mixture of 63.0 g of melamine (0.5 mol) and 288.0 g of sodium glyoxylate (3.0 mol) in 211 ml of water is heated at 90° C. for 30 minutes, and a clear solution forms.

EXAMPLE 8

A mixture of 42.0 g of melamine (0.33 mol) and 148.0 g of 50% strength aqueous glyoxylic acid solution (1.0 mol) is heated at 70° C. for 10 minutes, and the clear solution is cooled down to room temperature. 108.8 g of 40% strength aqueous glyoxal solution (0.75 mol) are then added, and the mixture is heated at 40° C. for 15 minutes to give a clear water-dilutable resin solution.

EXAMPLE 9

177.6 g of 50% strength aqueous glyoxylic acid solution (1.2 mol) are reacted with 96.0 g of 50% strength sodium hydroxide solution (1.2 mol) to give sodium glyoxylate. 50.4 g of melamine (0.4 mol) and 94 g of water are then added, and the mixture is heated at 60° C. for 15 minutes. The resulting clear solution is mixed at room temperature with 174.0 g of 40% strength aqueous glyoxal solution (1.2 mol), and the mixture is heated at 40° C. for a further 15 minutes. Structure:

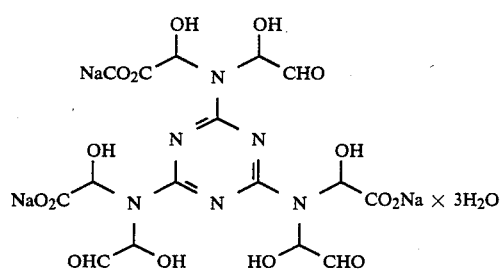

Analysis of the spray-dried product shows that the three aldehyde groups are hydrated. Empirical formula:

$C_{15}H_{21}N_6O_{18}Na_3$

| Analysis | C | H | N | O | Na |
|---|---|---|---|---|---|
| found | 28.8 | 3.2 | 12.7 | 44.7 | 11.0 |
| calculated | 28.1 | 3.3 | 13.1 | 44.8 | 10.7 |

EXAMPLES 10–15

Following the same procedure as in Example 9, products having different molar ratios of melamine:glyoxylic acid:glyoxal are prepared:

| Ex-ample | Melamine | | Glyoxylic acid 50% strength | | Sodium hydroxide solution 50% strength | | Water | Glyoxal 40% strength | |
|---|---|---|---|---|---|---|---|---|---|
| | (g) | (mol) | (g) | (mol) | (g) | (mol) | (g) | (g) | (mol) |
| 10 | 31.5 | 0.25 | 37.0 | 0.25 | 18.0 | 0.23 | 57.0 | 181.3 | 1.25 |
| 11 | 31.5 | 0.25 | 74.0 | 0.50 | 36.0 | 0.45 | 67.0 | 145.0 | 1.00 |
| 12 | 31.5 | 0.25 | 148.0 | 1.00 | 72.0 | 0.90 | 86.3 | 72.5 | 0.50 |
| 13 | 31.5 | 0.25 | 185.0 | 1.25 | 90.0 | 1.13 | 96.0 | 36.3 | 0.25 |
| 14 | 31.5 | 0.25 | 111.0 | 0.75 | 54.0 | 0.68 | 76.3 | 72.5 | 0.50 |
| 15 | 31.5 | 0.25 | 111.0 | 0.75 | 54.0 | 0.68 | 76.3 | 36.3 | 0.25 |

EXAMPLE 6

36.4 g of sulfamic acid (0.38 mol) are suspended in 77.0 g of water, and 30.0 g of 50% strength sodium hydroxide solution (0.38 mol) are added dropwise. 15.8 g of melamine (0.13 mol) and 109.0 g of 40% strength aqueous glyoxal solution are then added, the mixture is heated at 60° C. for 35 minutes. The result obtained is a clear resin solution which remains clear even on acidification.

EXAMPLES 17–19

Applying the procedure of Example 16 to different molar ratios of melamine:sulfamic acid:glyoxal likewise produces clear water-dilutable resin solutions which are stable even at acidic pH:

| Ex-ample | Melamine | | Sulfamic acid | | Sodium hydroxide solution 50% strength | | Water | Glyoxal 40% strength | |
|---|---|---|---|---|---|---|---|---|---|
| | (g) | (mol) | (g) | (mol) | (g) | (mol) | (g) | (g) | (mol) |
| 17 | 15.8 | 0.13 | 30.3 | 0.31 | 25.0 | 0.31 | 75.0 | 91.0 | 0.63 |
| 18 | 31.5 | 0.25 | 48.5 | 0.50 | 40.0 | 0.50 | 120.0 | 145.0 | 1.00 |
| 19 | 31.5 | 0.25 | 48.5 | 0.50 | 40.0 | 0.50 | 120.0 | 109.0 | 0.75 |

The stated amount of a 40% strength aqueous malamine/glyoxal resin solution of Example 3 is condensed at 40° C. with the stated amount of amide, amine or imine for 20 minutes. The results obtained are colorless or slightly yellow resin solutions.

| Ex ample | Melamine/glyoxal resin of Example 3 | | Condensed amide | |
|---|---|---|---|---|
| | (g) | (mol, based on melamine) | (g) | (mol) |
| 29 | 237.8 | 0.2 | 30.3 | 0.2 phenylglycine |
| 21 | 237.8 | 0.2 | 26.6 | 0.2 iminodiacetic acid |
| 22 | 237.8 | 0.2 | 19.8 | 0.2 succinimide |
| 23 | 237.8 | 0.2 | 11.8 | 0.2 acetamide |
| 24 | 237.8 | 0.2 | 35.4 | 0.6 acetamide |
| 25 | 237.8 | 0.2 | 27.0 | 0.6 formamide |
| 26 | 237.8 | 0.2 | 15.0 | 0.2 glycine |

-continued

| Ex ample | Melamine/glyoxal resin of Example 3 | | Condensed amide | |
|---|---|---|---|---|
| | (g) | (mol, based on melamine) | (g) | (mol) |
| 27 | 237.8 | 0.2 | 11.4 | 0.2 urea |
| 28 | 237.8 | 0.2 | 16.8 | 0.2 dicyandiamide |
| 29 | 237.8 | 0.2 | 50.4 | 0.2 dicyandiamide |
| 30 | 237.8 | 0.2 | 63.1 | 0.6 diethanolamine |
| 31 | 237.8 | 0.2 | 21.0 | 0.2 diethanolamine |
| 32 | 278.8 | 0.2 | 43.9 | 0.6 diethylamine |

Diethanolamine and diethylamine are added in the form of 40% strength solutions of their hydrochlorides in water at room temperature (Examples 30 to 32).

EXAMPLES 33–35

The stated amount of a 40% strength aqueous melamine/glyoxal resin solution of Example 3 is stirred at 70°–90° C. until all of the phenol derivative has been converted (monitoring by thin layer chromatography). The results obtained are yellow to brown resin solutions.

| Ex. ample | Melamine/glyoxal resin of Example 3 | | Cocondensed phenol derivative | |
|---|---|---|---|---|
| | (g) | (mol, based on melamine) | (g) | (mol) |
| 33 | 237.8 | 0.2 | 161.6 | 0.6 phenolsulfonic acid |
| 34 | 237.8 | 0.2 | 131.2 | 0.6 sulfosalicylic acid |
| 35 | 237.8 | 0.2 | 87.0 | 0.6 8-hydroxyquinoline |

EXAMPLE 36

42.0 g (0.33 mol) of melamine, 242.0 g (1.67 mol) of 40% strength aqueous glycol solution. 15 3 g (0.33 mol) of formic acid and 9.0 g of water are heated with stirring at 70° C. for 25 minutes. The result obtained on cooling down is a clear, slightly yellow resin solution of infinite water dilutability.

EXAMPLES 37–43

Example 36 is repeated to prepare resin solutions having different molar ratios of the starting materials:

| Example | Melamine (g) | Melamine (mol) | Glyoxal 40% strength (g) | Glyoxal 40% strength (mol) | Water (g) | Acid (g) | Acid (mol) |
| --- | --- | --- | --- | --- | --- | --- | --- |
| 37 | 50.4 | 0.40 | 232.0 | 1.60 | 22.5 | 18.4 | 0.40 formic acid |
| 38 | 126.0 | 1.00 | 435.0 | 3.00 | 62.0 | 23.0 | 0.50 formic acid |
| 39 | 126.0 | 1.00 | 290.0 | 2.00 | 114.0 | 46.0 | 1.00 formic acid |
| 40 | 31.5 | 0.25 | 35.8 | 0.25 | 36.0 | 12.0 | 0.25 formic acid |
| 41 | 189.0 | 1.50 | 654.0 | 4.50 | 0 | 150.0 | 1.50 concentrated HCl |
| 42 | 210.0 | 1.67 | 725.0 | 5.00 | 0 | 83.5 | 0.84 concentrated $H_2SO_4$ |
| 43 | 188.8 | 1.50 | 732.0 | 5.05 | 0 | 90.4 | 1.00 oxalic acid |

We claim:

1. A condensation product of melamine, glyoxylic acid and glyoxal for use as a tanning assistant, obtained by condensing 1 mole of melamine with from 1 to 5 moles of glyoxylic acid or an alkali metal salt thereof and with from 1 to 5 moles of glyoxal, the total number of moles of glyoxylic acid or alkali metal salt thereof and glyoxal being from 5 to 7, in aqueous solution at from 20° to 100° C., by first converting the total amount of glyoxylic acid or alkali metal salt thereof and then converting the glyoxal under the same conditions.

2. A condensation product as claimed in claim 1, modified by cocondensation with from 0.1 to 3.0 moles, based on 1 mole of melamine, of a compound having a phenolic hydroxyl group and selected from the group consisting of phenolsulfonic acid, sulfosalicylic acid, salicylic acid and 8-hydroquinoline or of a compound having a reactive nitrogen-containing group and selected from the group consisting of acetamide, benzamide, formamide, sulfamic acid, succinimide, glycine, iminodiacetic acid, phenylglycine, urea, dicyandiamide, diethanolamine and diethylamine.

3. A condensation product as claimed in claim 1, obtained by condensing 1 mole of melamine with from 2 to 4 moles of glyoxylic acid or an alkali metal salt thereof and with from 2 to 4 moles of glyoxal, the total number of moles of glyoxylic acid or alkali metal salt thereof and glyoxal being from 5.5 to 6.5.

4. A condensation product as claimed in claim 1, obtained by condensation from 1 mole of melamine, 3 moles of glyoxylic acid or an alkali metal salt thereof and 3 moles of glyoxal.

* * * * *